(12) United States Patent
Tinson et al.

(10) Patent No.: US 8,361,361 B2
(45) Date of Patent: Jan. 29, 2013

(54) FOAMING AGENTS FOR THERMOPLASTIC RESINS AND METHOD OF PREPARING SAME

(75) Inventors: Art Tinson, Hamilton (CA); Salvatore D'Uva, Brantford (CA); Jianzhong Hu, Cambridge (CA); John Lefas, Houston, TX (US)

(73) Assignee: Ingenia Polymers Corp., Toronto, Ontario (CA)

( * ) Notice: Subject to any disclaimer, the term of this patent is extended or adjusted under 35 U.S.C. 154(b) by 0 days.

(21) Appl. No.: 12/819,571

(22) Filed: Jun. 21, 2010

(65) Prior Publication Data

US 2011/0112207 A1    May 12, 2011

Related U.S. Application Data

(63) Continuation-in-part of application No. 11/728,559, filed on Mar. 26, 2007, now abandoned.

(60) Provisional application No. 60/785,385, filed on Mar. 24, 2006.

(51) Int. Cl.
*C01D 7/10* (2006.01)
*B29C 44/00* (2006.01)

(52) U.S. Cl. .................. 264/41; 23/293 A; 423/422

(58) Field of Classification Search .................. 424/489, 424/65, 421, 490, 717, 405; 514/951, 952; 426/19; 264/41; 23/293 A
See application file for complete search history.

(56) References Cited

U.S. PATENT DOCUMENTS

| | | | | |
|---|---|---|---|---|
| 5,275,794 A | * | 1/1994 | Luna | 423/190 |
| 5,411,750 A | | 5/1995 | Lajoie et al. | |
| 5,482,701 A | | 1/1996 | Winston | |
| 5,518,727 A | * | 5/1996 | Lajoie et al. | 424/400 |
| 5,928,584 A | * | 7/1999 | Lee et al. | 264/45.7 |
| 6,083,434 A | * | 7/2000 | Strebel | 264/45.7 |
| 6,352,653 B1 | | 3/2002 | Hirano et al. | |
| 6,767,931 B2 | | 7/2004 | Martinez et al. | |
| 2002/0172713 A1 | | 11/2002 | Einziger et al. | |
| 2007/0286790 A1 | | 12/2007 | Tinson et al. | |

FOREIGN PATENT DOCUMENTS

WO    07/109885    10/2007

OTHER PUBLICATIONS

International Search Report and Written Opinion from PCT/CA07/000485 dated Jul. 12, 2007.
Office action from U.S. Appl. No. 11/728,559 dated Mar. 18, 2009.
Response from U.S. Appl. No. 11/728,559 dated Jul. 22, 2009.
Office action from U.S. Appl. No. 11/728,559 dated Dec. 21, 2009.
Notice of Abandonment from U.S. Appl. No. 11/728,559 dated Jul. 7, 2010.

* cited by examiner

*Primary Examiner* — Wayne Langel
*Assistant Examiner* — Syed Iqbal
(74) *Attorney, Agent, or Firm* — Calfee Halter & Griswold LLP

(57) ABSTRACT

Ultra-fine sodium bicarbonate powder (mean particle size less than 5 microns) is produced by the mixing and reaction under agitation at control temperatures of solutions of ammonium bicarbonate and sodium chloride. Precipitated sodium bicarbonate is separated by filtration as a slurry which is dried to produce ultra-fine sodium bicarbonate. Ultra-fine sodium bicarbonate produced by this method also exhibits a narrow particle size distribution which is advantageous in blowing agents for thermoplastic resins, to produce a foamed resin with small cells of a narrow size distribution.

9 Claims, 10 Drawing Sheets

FOAMING AGENTS FOR THERMOPLASTIC RESINS AND METHOD OF PREPARING SAME

CROSS-REFERENCE TO RELATED APPLICATIONS

This application is a continuation-in-part of U.S. Ser. No. 11/728,559 filed on Mar. 26, 2007 and entitled PROCESS FOR PREPARING ULTRA-FINE SODIUM BICARBONATE POWDER, which claims priority to U.S. Provisional Patent Application Ser. No. 60/785,385, filed Mar. 24, 2006, both of which are incorporated herein in their entirety by reference.

FIELD OF THE INVENTION

This invention relates to a process for preparing ultra-fine sodium bicarbonate (i.e. having an average particle size of less than about 5 microns), which exhibits a narrow particle size distribution, and has been found to be particularly useful as an ingredient in foaming (blowing) agents for polymeric materials such as polyethylene and other thermoplastic or rubber materials. The small particle size and narrow particle size distribution of $NaHCO_3$ prepared according to the invention is conducive to the production of small and uniform cell size in the foamed plastic.

BACKGROUND AND PRIOR ART

Sodium bicarbonate, commonly known as baking soda, is traditionally used as a leavening agent in the food industry. It is also widely used in household, personal care and industrial applications. There are two typical industrial processes for manufacturing sodium bicarbonate; the Solvay process and Trona ore mining.

Sodium bicarbonate is an intermediate product of the Solvay process, whose targeted end product is sodium carbonate. In the Solvay process, ammonia and carbon dioxide are sparged through a saturated sodium chloride solution to form a solution containing ammonium bicarbonate. This ammonium bicarbonate is then reacted with sodium chloride to form ammonium chloride and sodium bicarbonate. Ammonium chloride is very soluble, and the much less soluble sodium bicarbonate is precipitated and crystallized, if the temperature is kept below 15° C. The precipitated sodium bicarbonate is filtered off, heat is applied to decompose it and sodium carbonate is obtained as the desired end product.

A second manufacturing process is based on Trona ore, a sodium sesquicarbonate mineral ore ($Na_2CO_3.NaHCO_3.2H_2O$), mined mostly in Wyoming, USA. The ore is first crushed and screened. It is then calcined to raw sodium carbonate, carbon dioxide and water. The sodium carbonate is dissolved and filtered to eliminate impurities. Carbon dioxide is bubbled into the saturated pure sodium carbonate solution and the sodium bicarbonate precipitates out to be collected and dried. Trona ore mining is the most dominant process for producing sodium bicarbonate in North America because it is cheaper to mine the ore than to synthesize $NaHCO_3$ from other raw materials.

Foaming plastics and rubbers is a known industrial application of sodium bicarbonate. After $NaHCO_3$ is added into melted plastics or rubber material, it decomposes releasing carbon dioxide. The formation of gas bubbles results in a cellular foam structure.

Among the numerous desirable attributes achieved by the foaming of plastics and rubber materials are energy absorption, low thermal conductivity, sound absorption, low thermal conductivity for insulation properties, cushioning, soft and flat surfaces, high strength/weight ratios for good strength and softness, improved thermal strength and thermal and chemical inertness.

A number of patents are directed to the preparation of sodium bicarbonate powder having small particle size or other particular useful physical characteristics such as substantial sphericity of the sodium bicarbonate particles [published U.S. Patent Application No. 2002/0172713-Einzinger et al and microporosity, U.S. Pat. No. 5,482,701 (Winston)].

Very fine or ultrafine sodium bicarbonate powders have been prepared by a number of methods. U.S. Pat. No. 5,411,750 (Lajoie et al.) describes the precipitation of sodium bicarbonate from aqueous solution by the gradual addition of a water-miscible organic solvent such as $CH_3OH$. This is claimed to produce sodium bicarbonate powder having an average particle size less than about 1 micron, but with a broad particle size distribution, between about 0.1 and 1 micron.

U.S. Pat. No. 6,352,653 (Hirano et al.) is said to produce sodium bicarbonate having a volume-based mean particle diameter of from 1 to 9 microns. This sodium bicarbonate powder is obtained by grinding $NaHCO_3$ using an impact-type grinder equipped with an air classifier, which classifies particles discharged from the grinder and returning large particles to the grinder.

SUMMARY OF THE INVENTION

We have discovered that ultra-fine sodium bicarbonate having a relatively narrow particle size distribution and desired crystal shape can be obtained by the controlled reaction of sodium chloride and ammonium bicarbonate in aqueous solution, under selected conditions of concentration, temperature and rate of agitation.

The synthetic process of this invention is essentially a variation on the Solvay process. Ammonium bicarbonate itself is used as a reactant rather than the separate introduction of ammonia and carbon dioxide as sources of ammonization and carbonation. The ammonium bicarbonate is added to a sodium chloride solution under controlled temperature and agitation. The resulting sodium bicarbonate is precipitated out of the solution as slurry. The precipitate can be dried using a vacuum oven, freeze drying or spray-drying to form ultra-fine particulate sodium bicarbonate with advantageous characteristics as a plastics foaming agent.

Sodium bicarbonate prepared by the method of the invention can be formulated into blowing agent master batch by adding other functional additives and minerals such as citric acid and surfactants. The blowing agent is used for the foaming of plastics such as LDPE, LLDPE, HDPE, EVA, GPPS (General Purpose Polystyrene) and HIPS (High impact polystyrene) to produce foams exhibiting ultra-fine cell structure and narrow size distribution.

DETAILED DESCRIPTION OF THE INVENTION

Figure 1A:
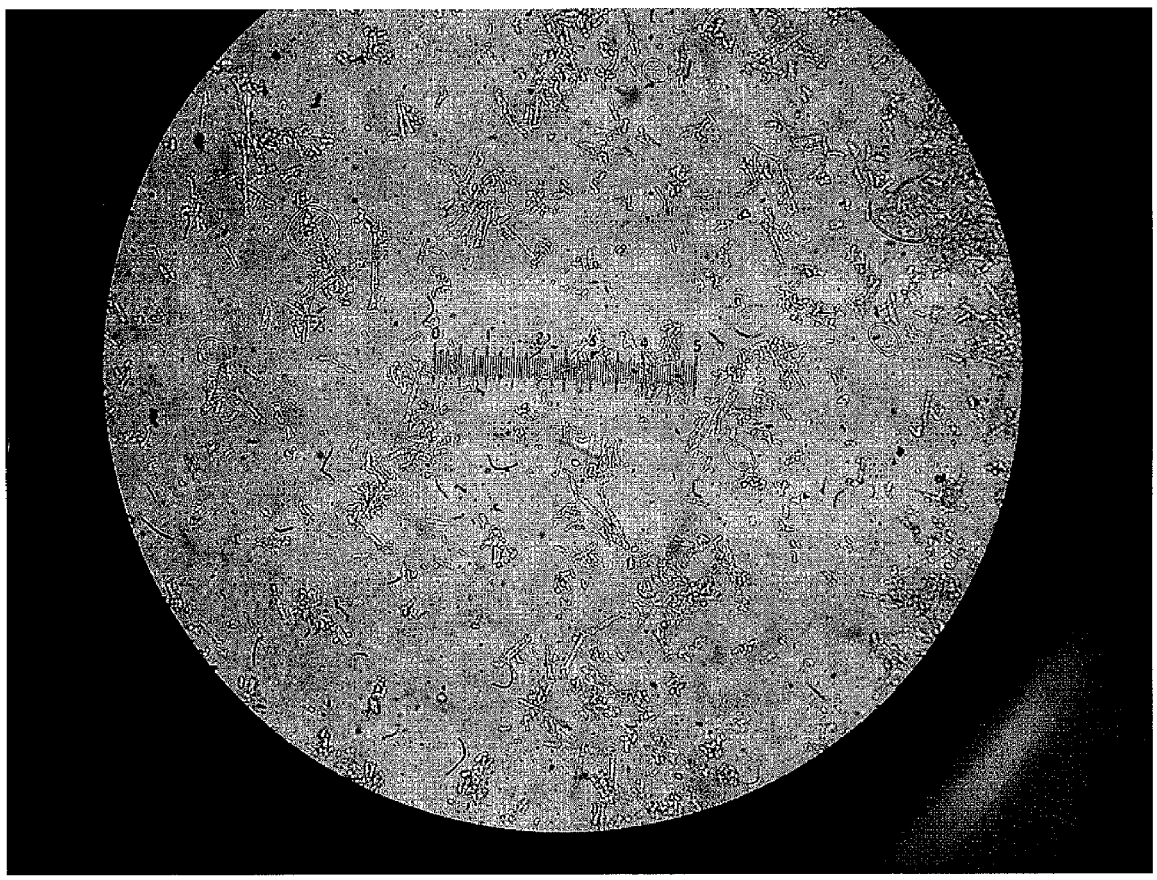
FIGS. 1A and 1B are low and high magnifications of a photomicrograph of sodium bicarbonate prepared according to the method of Example 2(a).

The sodium chloride and ammonium bicarbonate solutions which are reacted together according to the method of the invention can each be saturated or unsaturated. Different concentrations result in differences in the precipitated sodium bicarbonate particle size and particle size distribution, as well as in its crystal shape.

The solubility of sodium chloride in water at 0° C. is 35.9 g/100 ml while that of ammonium bicarbonate is 11.9 g/100 ml. The solubility of sodium bicarbonate at 0° C. is only 6.9 g/100 ml. The reaction temperature should be kept below 30° C., with optimal results below 15° C. Stirring speeds can vary from Speed 1 to Speed 6 on a home blender. A Kitchen-Works™ Model CB5700, Byupe B12 was employed in the experimental Examples herein presented with settings from lowest (Speed 1) to maximum (Speed 6). Reaction times range from 20 to 60 seconds.

To the solution, a minor amount of calcium silicate may then be added to act as a flow enhancing and anti-caking agent for the later-precipitated $NaHCO_3$ powder. This use of calcium silicate is conventional in preparing of formulated edible salts.

According to an embodiment of the process, such as GMS (glycerol monostearate). A crystallization controlling agent to facilitate formation of sodium bicarbonates of smaller particle size.

Other organic solvents including methanol, ethanol, acetone, N,N-dimethylformamide, tetrahydrofuran etc., may optionally be added at this stage in this synthesis to control the size and size distribution of the bicarbonates.

Following precipitation, a sodium bicarbonate slurry is removed from the reaction mixture by filtration and dried. Drying methods which may be used in this invention includes vacuum drying, freeze drying and spray drying. Spray drying has been found to exhibit the highest drying efficiency. Spray drying can be conducted at temperatures from 60° C. to 120° C.

The dry $NaHCO_3$ powder obtained can be post ground by an air mill to break apart any aggregates or agglomerates of the ultra-fine particles formed in the crystallization/drying process.

Sodium Bicarbonate Particle Size and Size Distribution

The following Examples illustrate the effect of reaction conditions (reaction time, stirring intensity, reactant levels and reaction temperature) on particle size and particle size distribution.

EXAMPLE 1(a)

40 grams of pure sodium chloride were dissolved in 100 ml of water at 30° C. to make a saturated solution. The solution temperature was kept at about 30° C. 10 grams of ammonium bicarbonate was weighed out and added to the saturated sodium chloride solution with intensive mixing (blender Speed 1) for 20 seconds. The precipitate was filtered off with the help of a vacuum.

A single drop of the precipitated slurry was sampled onto microscope slide and examined at 10×40 magnification. A digital photo was taken. The photo was analyzed using Image ProPlus™ software, an image analysis software to measure the particle size and particle size distribution. The resulting particles exhibited an average size of 1.94 microns and a particle size distribution (one standard deviation) of 1.04 microns, i.e. 53.6% of the mean particle size.

EXAMPLE 1(b)

40 grams of edible sodium chloride were added to 100 ml of water to prepare a saturated solution. The solution temperature was then brought to kept at 5° C. and 20 grams of ammonium bicarbonate was added to the saturated sodium chloride solution with intensive mixing (Speed 1) for 20 seconds. The precipitate was vacuum-filtered away from the liquid.

One drop of the precipitated slurry was sampled as above and examined at and made into a 10×40 magnification. A digital photo was taken. The photo was again analyzed by Image ProPlus. The resulting particles were found have an average size of 0.69 microns and a particle size distribution of 0.40 microns, i.e. 58.0% of the mean particle size.

Sodium Bicarbonate Particle Shape

The following Examples illustrate the effect of reaction conditions (reaction time, stirring intensity, reactant solution concentration and reaction temperature) on particle shape.

EXAMPLE 2(a)

20 grams of pure sodium chloride was dissolved in 100 ml of water. The solution temperature was lowered to and kept at 5° C. 20 grams of ammonium bicarbonate was weighed and added to the saturated sodium chloride solution with intensive mixing (blender Speed 1) for 20 seconds. The precipitate was filtered off with help of a vacuum.

Figure 1B:
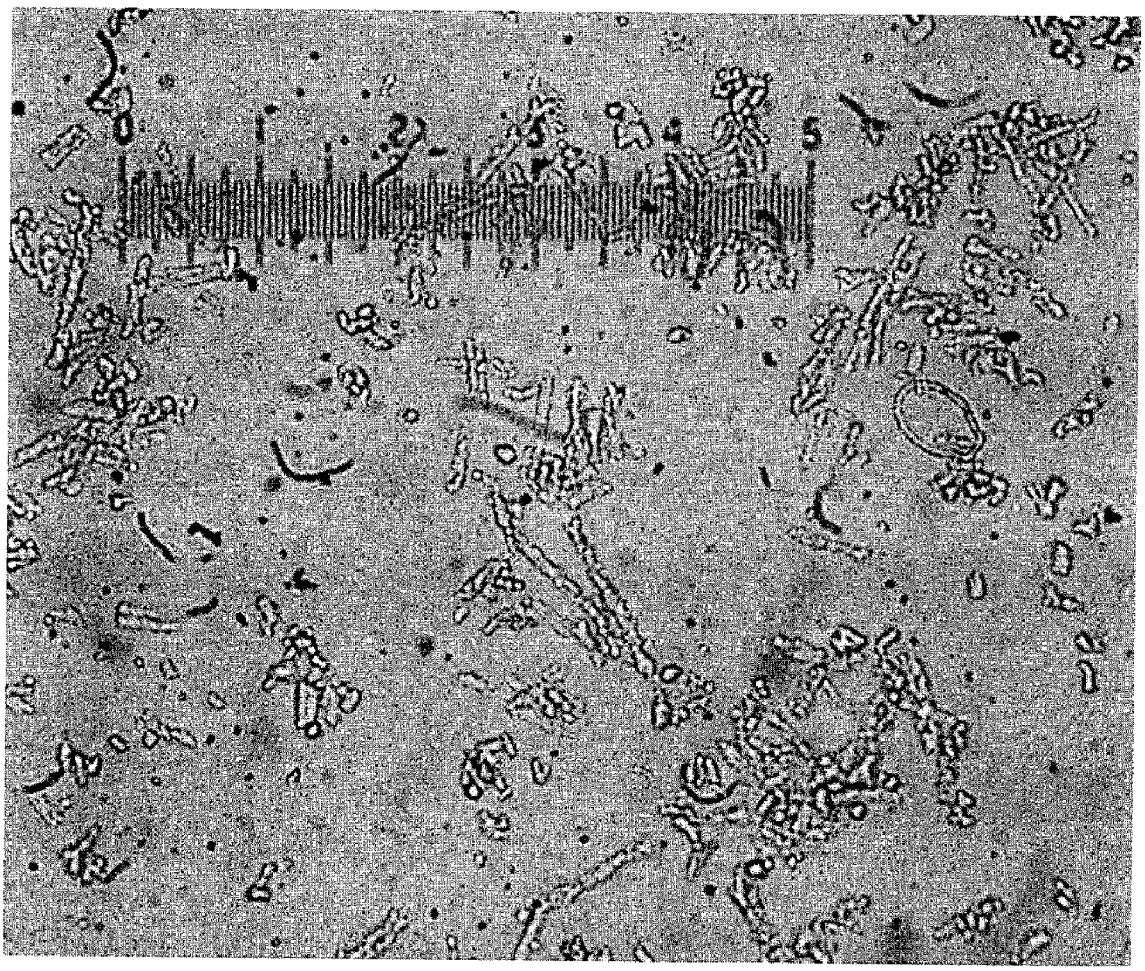

One drop of the precipitated slurry was sampled and was micro-photographed as before. A digital photo was taken and is reproduced in FIGS. 1A and 1B which clearly show the filamentous shape of the $NaHCO_3$ crystals. The photograph was analyzed by Image ProPlus. The particles have an average size of 1.93 microns and a particle size distribution of 0.73 microns (i.e. standard deviation 37.8% of mean particle size.

EXAMPLE 2(b)

20 grams of pure sodium chloride was dissolved in 100 ml of water to make a saturated solution. The solution temperature was lowered to and kept at 5° C. 10 grams of ammonium bicarbonate was added to the saturated sodium chloride solution with intensive mixing (blender Speed 6) for 60 seconds. The precipitate was vacuum-filtered.

Figure 2A:
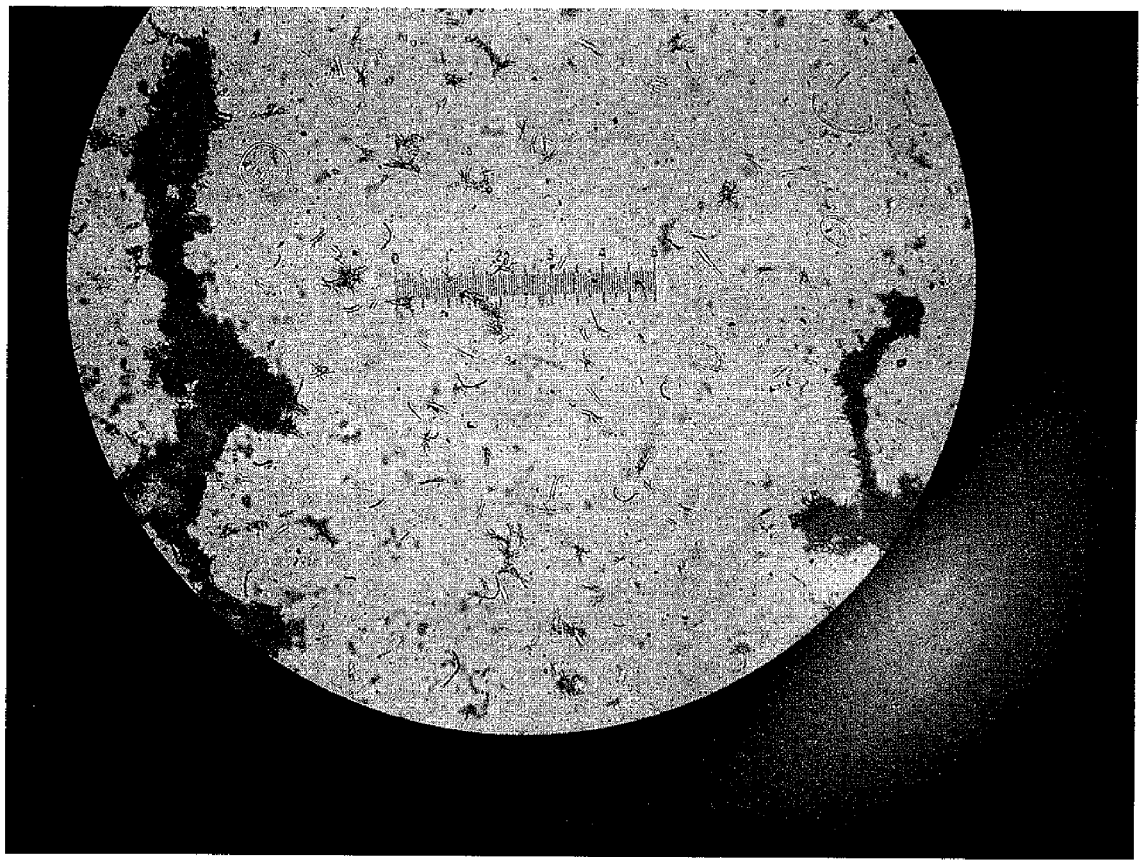
FIGS. 2A and 2B are low and high magnifications of a photomicrograph of sodium bicarbonate prepared according to the method of Example 2(b).
Figure 2B:
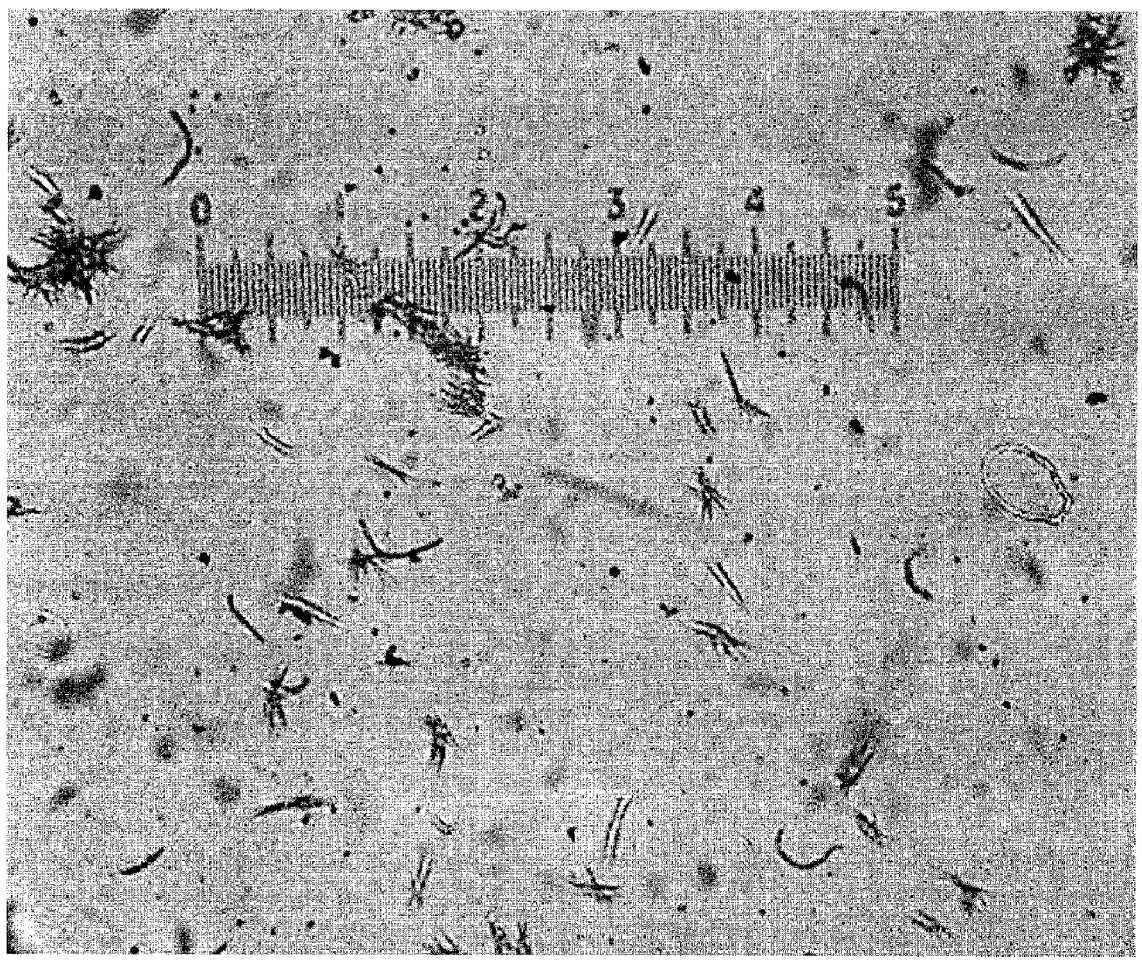

One drop of the precipitated slurry was sampled. A digital photo was taken, reproduced as FIGS. 2A and 2B, showing a generally needle-like shape of crystals. The photo is analyzed by Image ProPlus. The resulting particles were seen to have an average size of 0.80 microns and a particle size distribution of 0.32 microns (i.e. standard deviation 40.0% of mean particle size).

EXAMPLE 2(c)

A saturated solution of sodium chloride was kept at 30° C. 10 grams of ammonium bicarbonate was added to the saturated sodium chloride solution with intensive mixing (blender Speed 6) for 60 seconds. The precipitate was vacuum-filtered.

Figure 3A:
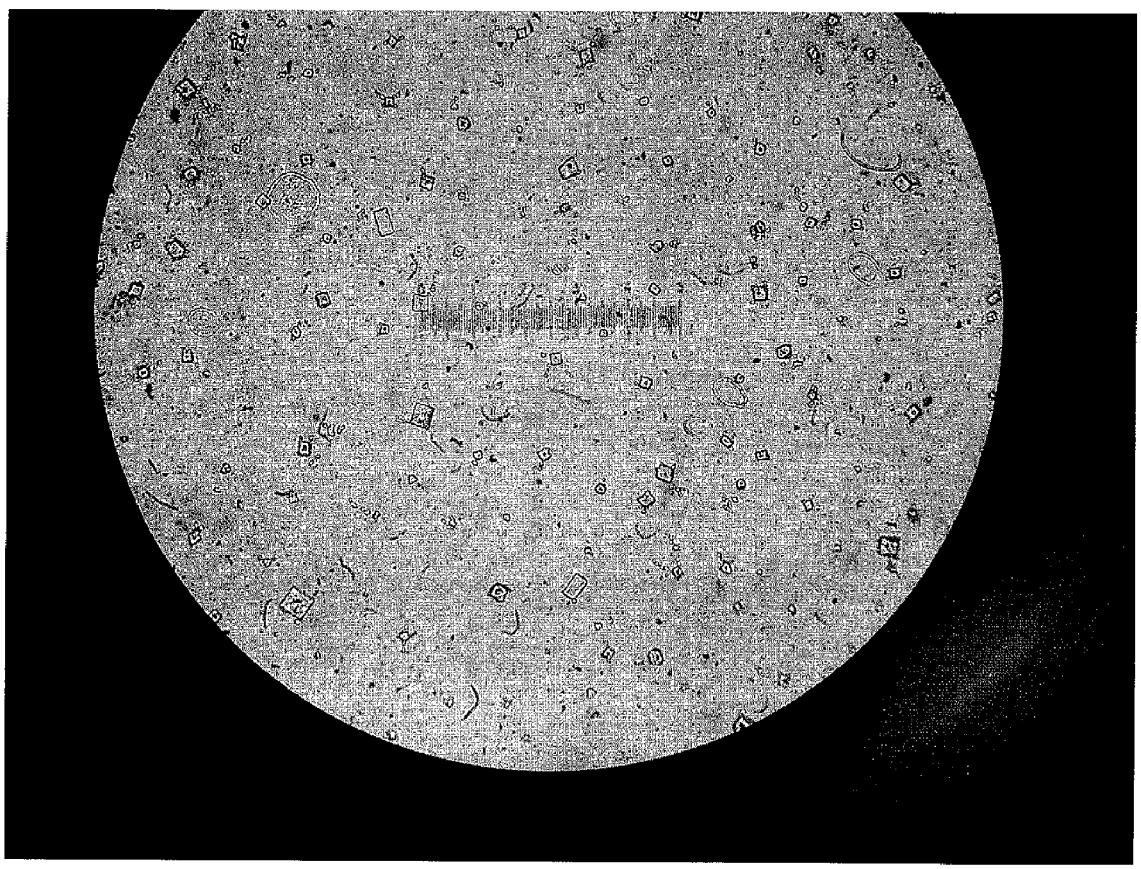
FIGS. 3A and 3B are low and high magnifications of a photomicrograph of sodium bicarbonate prepared according to the method of Example 2(c).
Figure 3B:
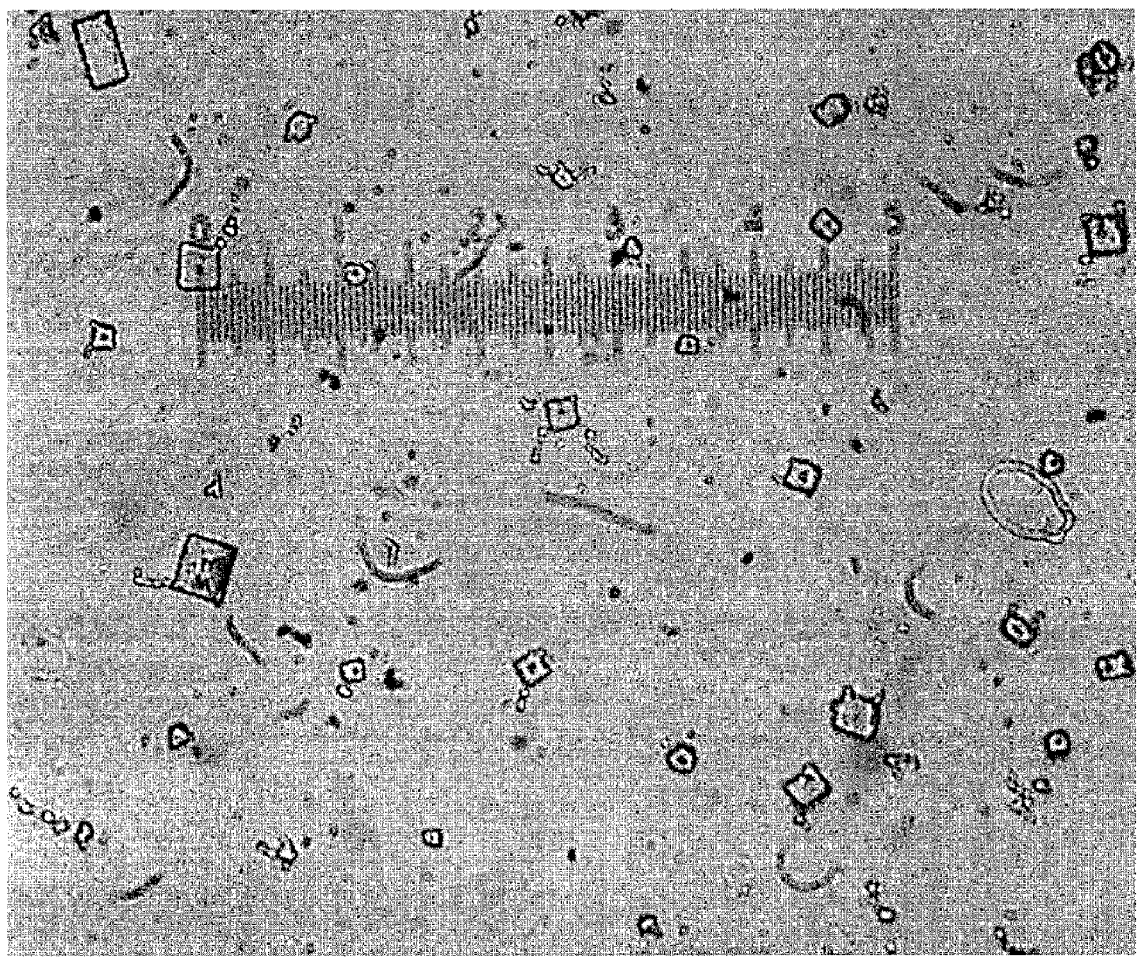

Again one drop of the precipitated slurry was sampled, deposited on a microscope slide and a digital photograph taken, reproduced in FIGS. 3A and 3B, from which the cubic shape of the crystals can be seen at 10×40 magnification. The photo was analyzed by Image ProPlus, and these particles were found to have an average size of 1.42 microns and a particle size distribution of 1.31 microns, (i.e. standard deviation 92% at mean particle size).

EXAMPLE 2(d)

40 grams of edible sodium chloride was dissolved in 100 ml of water to make a saturated solution. The solution temperature was then lowered and kept at 5° C. 10 grams of ammonium bicarbonate was added into the saturated sodium chloride solution with intensive mixing (blender Speed 1) for 20 seconds. The precipitate was filtered off with the help of a vacuum, as in the previous Examples.

Figure 4A:
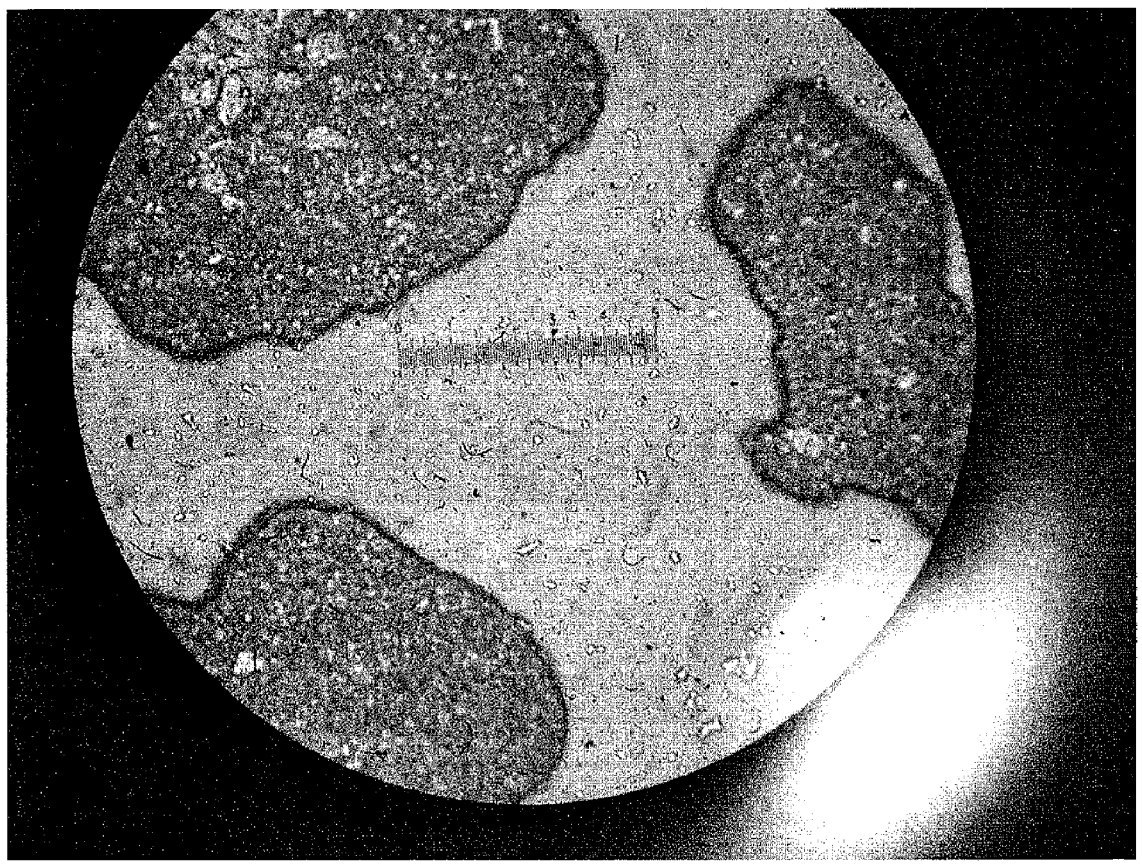
FIGS. 4A and 4B are low and high magnifications of a photomicrograph of sodium bicarbonate prepared according to the method of Example 2(d).
Figure 4B:
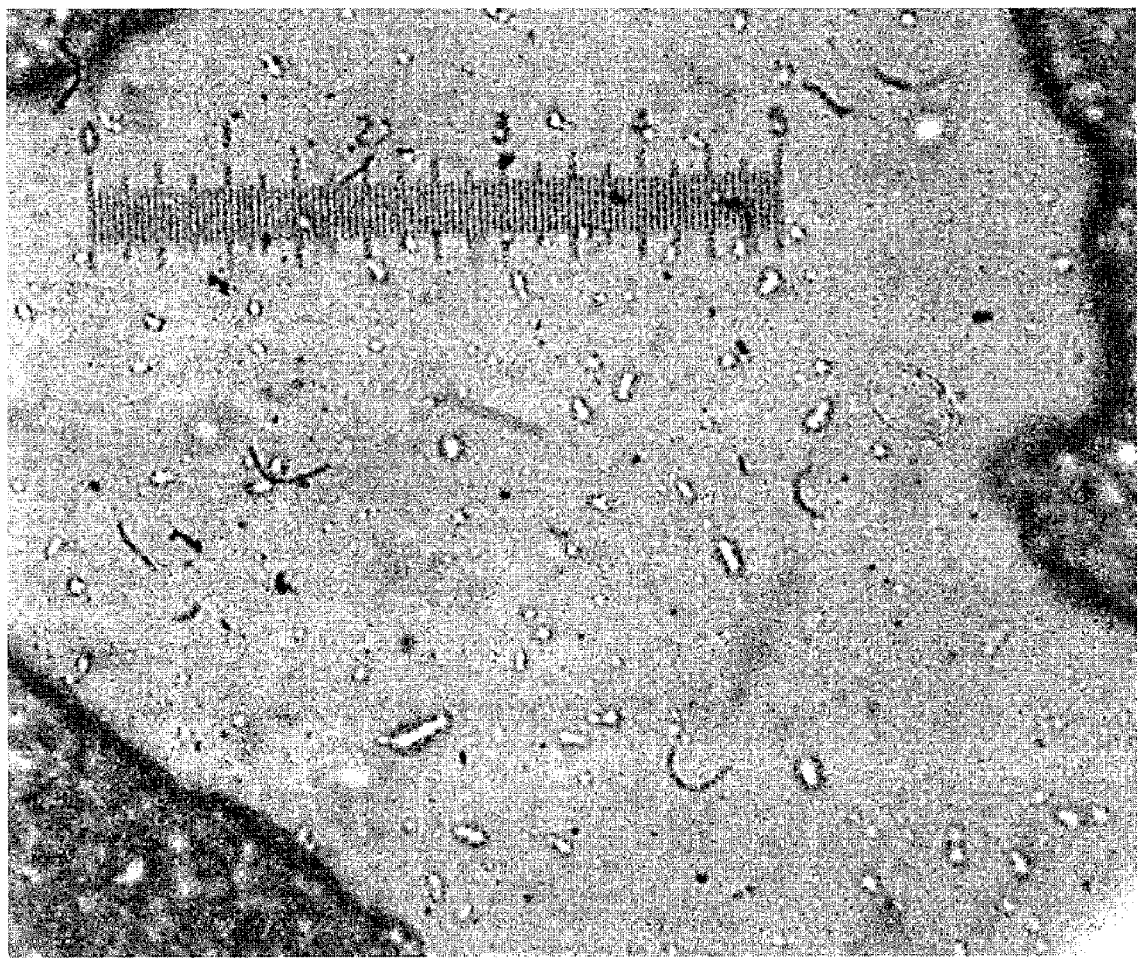
Figure 5A:
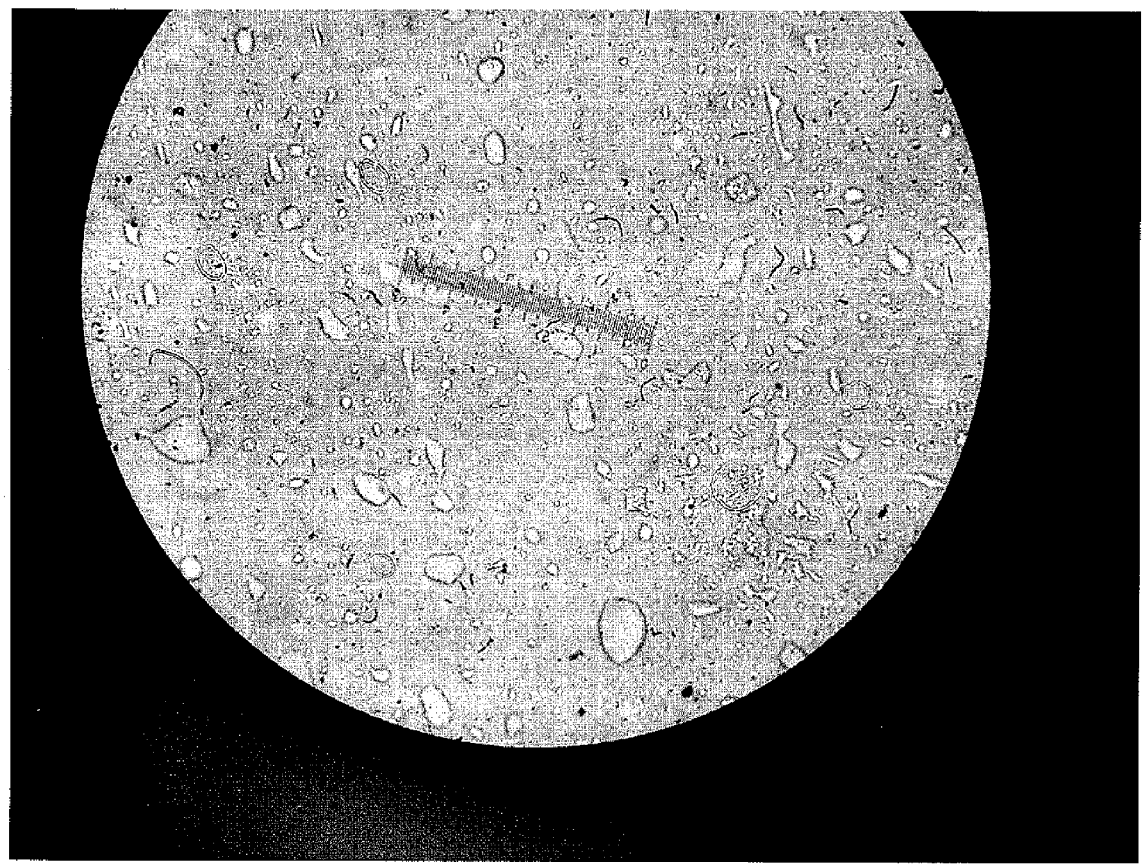
FIGS. 5A and 5B are respectively low and high magnifications of a photograph of sodium bicarbonates prepared according to the method of the invention and dried using a vacuum oven.
Figure 5B:
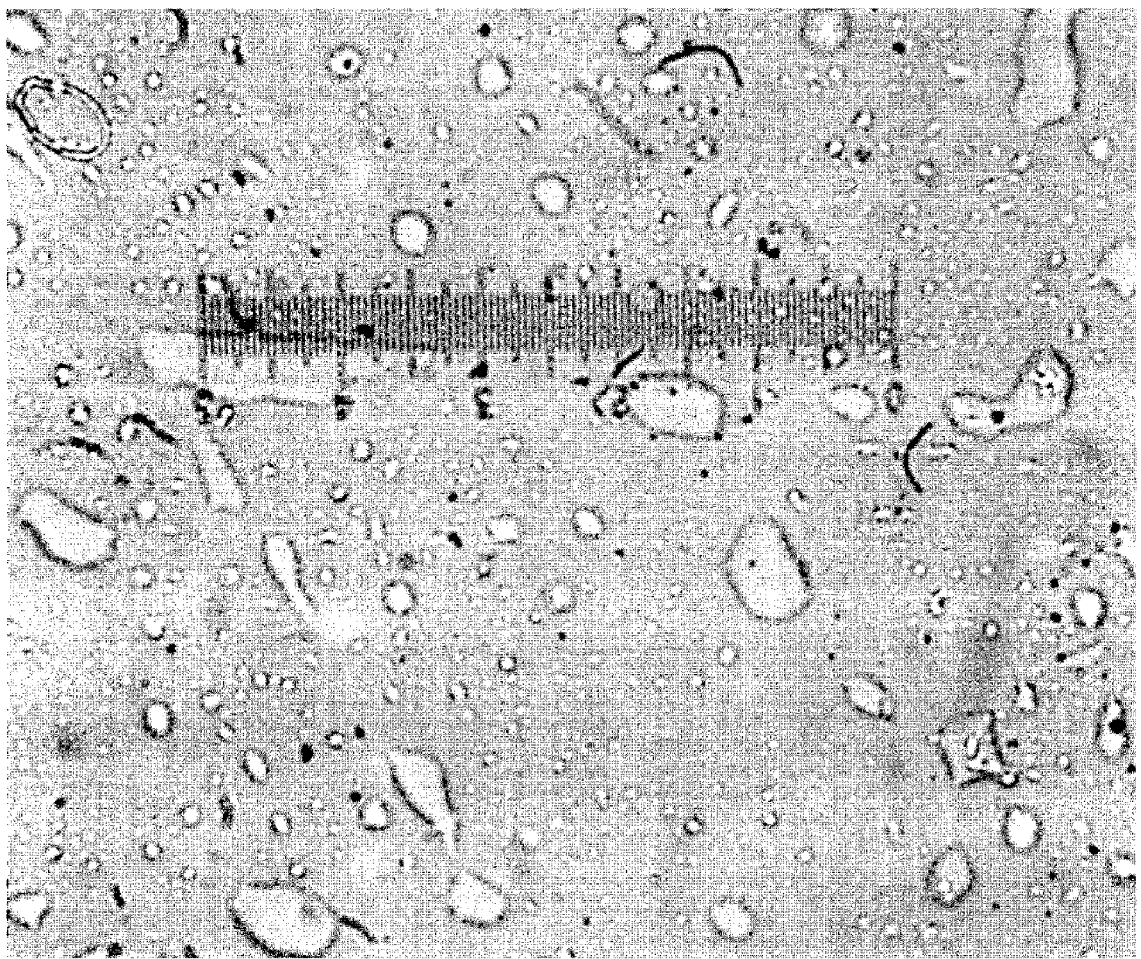

A drop of the precipitated slurry was photographed with 10×40 magnification and the digital photograph was analyzed by Image ProPlus. The resulting particles were found to have an average size of 1.32 microns and a particle size distribution of 0.66 microns, (i.e. standard deviation 50% of mean particle size). As may be seen from the reproduction of FIGS. 4A and 4B the crystals have a generally spherical shape.

The Table below summarizes experimental results from the above Examples. The width of the particle size distribution of the sodium bicarbonate powder produced in each Example is indicated by the size of one standard deviation, expressed in microns and also as a percentage of the mean particle size.

| Example # | Salt (g) | Salt Type | Ammonium Bicarbonate (g) | Mixer Speed | Mixer Time (s) | Temp (° C.) | Shape | Average Size (μm) | Standard Deviation (μm)/% at average |
|---|---|---|---|---|---|---|---|---|---|
| 1(a) | 40 | pure | 10 | 1 | 20 | 30 | — | 1.94 | 1.04/53.6 |
| 1(b) | 40 | edible* | 20 | 1 | 20 | 5 | — | 0.69 | 0.4/58.0 |
| 2(a) | 20 | pure | 20 | 1 | 20 | 5 | filament | 1.93 | 0.73/37.8 |
| 2(b) | 20 | pure | 10 | 6 | 60 | 5 | needle | 0.8 | 0.32/40.0 |
| 2(c) | 40 | pure | 10 | 6 | 60 | 30 | cubic | 1.42 | 1.31/92.0 |
| 2(d) | 40 | edible* | 10 | 1 | 20 | 5 | spherical | 1.32 | 0.66/50.0 |

*contains ~2% sodium silicate, routinely added as a flow-aid in commercially available NaCl Effect Selection of Drying Method Three methods were investigated: vacuum oven drying, freeze drying and spray drying.

Vacuum Oven Drying

As in Example 1(a) above, 40 grams of edible sodium chloride was dissolved in 100 ml of water to make a saturated solution. The solution temperature was kept at 5° C. 20 grams of ammonium bicarbonate was added to the saturated sodium chloride solution with intensive mixing (blender Speed 1) for 20 seconds.

The filtrate was dried using a vacuum oven under a 15 inch mercury vacuum at 75° C. for 72 hours. A dry powder was obtained. The dry powder was displaced. A digital photo was taken which again was analyzed by Image ProPlus. The resulting particles had an average size of 1.27 microns, a particle size distribution of 0.38 microns (1 standard deviation=30% of mean particle size) and are seen in photographic reproductions 5A and 5B.

Freeze Drying

A precipitate of NaHCO₃ was prepared according to the method of Example 1(b).

The solution was filtered using a centrifuge at 8000 rpm for 10 minutes. The precipitate was dried using a freeze dryer under a vacuum at −50° C. for 150 hours and a dry NaHCO₃ powder was obtained. The dry powder was sampled and a 10×40 magnification photograph was analyzed by Image ProPlus. The resulting particles have an average size of 1.34 microns and a particle size distribution of 0.38 microns (i.e. standard deviation 28% of mean particle size).

Fluidized Bed Drying

A precipitate of NaHCO₃ was prepared according to the method of Example 1(b).

Excess water in the synthesized slurry was filtered off by vacuum filtration. After filtering, the powder cake residue was removed and placed into a furnace at 40° C. for approximately 16 hrs. There was an approximate 8.3% weight loss after the furnace drying step, owing to loss of moisture. The dried cake was than broken into particles in a high sheer grinder, and introduced into a fluidized bed drier system. A small fluidized bed was used for the system. The airflow rate to the fluidized bed was approximately 1 ft²/min. The temperature of the air at the inlet to the fluidized bed was approximately 49° C. The powder sample was divided into about four portions, and each portion was fluidized for about 3-4 hours.

The dry powder was sampled and observed using scanning electron microscopy. The resulting particles were asymmetrical in shape and of an average size of 2.55 microns, analyzed by laser diffraction.

Spray Drying 40 grams of edible sodium chloride was dissolved in 100 ml of water to make a saturated solution. The solution temperature was brought to 5° C., and 20 grams of ammonium bicarbonate was added into the saturated sodium chloride solution with intensive mixing (blender Speed 1) for 20 seconds.

The sodium bicarbonate slurry produced was dried using the fluidized bed technique. Subsequent drying was carried out by a spray drying technique. A 0.5% concentration of sodium bicarbonate in water was prepared and placed in the spray drier. The inlet temperature to the spray drier was set at 120° C. and the outlet temperature measured at 73° C. The air flowrate to the system was set at 439 L/hr. The peristaltic pump was set at 3 mL/min, and the aspirator was set at 100% to maximize the separation rate.

The dry powder was sampled and observed using scanning electron microscopy. The resulting particles were spherical in shape. The particle size of the dry powder was analyzed via a laser diffraction mechanism, and the NaHCO₃ particles were found to have an average size of 2.47 microns.

Spray drying was also carried out using a 0.2% concentration of synthesized sodium bicarbonate in water. The inlet temperature to the spray drier was set at 120° C. and the outlet temperature measured at 55° C.-70° C. The air flowrate to the system was set at 439 L/hr. The peristaltic pump was set at ~5 mL/min, and the aspirator was set at 100% to maximize the separation rate of the cyclone.

The dry powder was sampled and observed using scanning electron microscopy. The resulting particles were spherical in shape. The particle size of the dry powder analyzed via a laser diffraction mechanism was an average size of 1.94 microns.

Formulation of Foaming Agents

In each of the five following Examples, a foaming agent was prepared by blending 6.5 grams of a sodium bicarbonate powder, 6.5 grams of monosodium citrate, 2.6 grams of calcium stearate (Blachford) and 49.4 grams of ethylene vinyl acetate (EVA) resin (Atevar 2030™), These components were melt-mixed using a Brabender mixer at 100° C. for 1.5 minutes. The melt was cold pressed and cut into pieces. In each test, the blowing agent masterbatch was used for foaming an LDPE resin (Nova LFY-819A, Melt Index 0.75 g/10 min, Density 0.920 g/cm$^3$) at a 4% letdown ratio.

EXAMPLE 4 (a)

Control Test

In this example the sodium bicarbonate used was a commercial grade (Church & Dwight USP Grade 5). The foamed LDPE resin which result had a average cell size 98.1 microns and bulk density of 0.25 g/cm$^3$.

EXAMPLE 4(b)

Sodium bicarbonate prepared according to the method of Example 3(a) was used to produce foam with an average cell size of 26.6 microns and bulk density of 0.626 g/cm$^3$.

EXAMPLE 4(c)

In this Example, the sodium bicarbonate used was prepared according to Example 3(b). In the result, foamed LDPE resin was produced with an average cell size of 22.7 microns and foam bulk density of 0.604 g/cm$^3$.

EXAMPLE 4(d)

Sodium bicarbonate according to the procedure of Example 3(c) was used to produce the blowing. The foamed LDPE resin exhibited an average cell size of 79.6 microns and foam bulk density of 0.764 g/cm$^3$.

EXAMPLE 4(e)

In this case, the sodium bicarbonate was produced according to Example 3(d). Foam with an average cell size of 60.9 microns and foam bulk density of 0.747 g/cm$^3$ was made.

We claim:

1. A method of preparing a foaming agent masterbatch for a thermoplastic resin, comprising:
    (a) melt-mixing a selected amount of an ultra-fine sodium bicarbonate powder with a thermoplastic resin and selected amounts of suitable functional additives and minerals; and
    (b) cold-pressing the melt into a solidified foaming agent masterbatch composition, wherein said sodium bicarbonate powder is prepared by
    providing an aqueous solution of sodium chloride and an aqueous solution of ammonium bicarbonate;
    mixing the two aqueous solutions in a stirring vessel and stirring at high speed for a period from 20 to 60 seconds at a reaction temperature below 30° C.;
    separating precipitated sodium bicarbonate from the stirred mixture; and
    drying the sodium bicarbonate to produce an ultra-fine powder having a particle size of less than 5 microns and a standard deviation in particle size less than the mean particle size.

2. A method according to claim 1, wherein said reaction temperature is below 15° C.

3. A method according to claim 2, wherein said dry sodium bicarbonate ultra-fine powder exhibits a mean particle size of less than 2 microns with a standard deviation in particle size less than the mean particle size.

4. A method according to claim 1, wherein said functional additives comprise citric acid.

5. A method according to claim 4, wherein said thermoplastic resin is low-density polyethylene (LDPE).

6. A method according to claim 1, wherein the aqueous solution of sodium chloride contains sodium chloride in a concentration from 20 g/l to 40 g/l.

7. A method according to claim 1, wherein the aqueous solution of ammonium bicarbonate contains ammonium bicarbonate in a concentration from 10 g/l to 20 g/l.

8. A method according to claim 1, wherein the aqueous solution of sodium chloride is a saturated solution at said reaction temperature.

9. A method according to claim 1, wherein the aqueous solution of ammonium bicarbonate is a saturated solution at said reaction temperature.

* * * * *